Nov. 3, 1959 J. J. BAIRD ET AL 2,911,018
MEANS FOR ASSEMBLING LADDERS
Filed Feb. 12, 1957 11 Sheets-Sheet 1

INVENTORS
Joseph J. Baird
and Conrad A. Osovski
BY C. P. Goepel
their ATTORNEY

Nov. 3, 1959    J. J. BAIRD ET AL    2,911,018
MEANS FOR ASSEMBLING LADDERS
Filed Feb. 12, 1957    11 Sheets-Sheet 2

INVENTORS
Joseph J. Baird
and Conrad A. Osovski
BY C. P. Goepel
their ATTORNEY

Nov. 3, 1959   J. J. BAIRD ET AL   2,911,018
MEANS FOR ASSEMBLING LADDERS
Filed Feb. 12, 1957   11 Sheets-Sheet 3

INVENTORS
Joseph J. Baird
and Conrad A. Osovski
BY C. P. Goepel
their ATTORNEY Nov. 3, 1959   J. J. BAIRD ET AL   2,911,018
MEANS FOR ASSEMBLING LADDERS
Filed Feb. 12, 1957   11 Sheets-Sheet 5

INVENTORS
Joseph J. Baird
and Conrad A. Osovski,
BY C. P. Goepel
their ATTORNEY

Nov. 3, 1959 J. J. BAIRD ET AL 2,911,018
MEANS FOR ASSEMBLING LADDERS
Filed Feb. 12, 1957 11 Sheets-Sheet 8

Nov. 3, 1959 J. J. BAIRD ET AL 2,911,018
MEANS FOR ASSEMBLING LADDERS
Filed Feb. 12, 1957 11 Sheets-Sheet 9

INVENTORS
Joseph J. Baird
and Conrad A. Osovski
BY C. P. Goepel
their ATTORNEY

Nov. 3, 1959  J. J. BAIRD ET AL  2,911,018
MEANS FOR ASSEMBLING LADDERS
Filed Feb. 12, 1957  11 Sheets-Sheet 10

INVENTORS
Joseph J. Baird
and Conrad A. Osovski
BY
their ATTORNEY

United States Patent Office 2,911,018
Patented Nov. 3, 1959

2,911,018

MEANS FOR ASSEMBLING LADDERS

Joseph J. Baird and Conrad A. Osovski, Newark Valley, N.Y., assignors to Chesebro Whitman Manufacturing Corporation, Newark Valley, N.Y., a corporation of New York Application February 12, 1957, Serial No. 639,819

9 Claims. (Cl. 144—2)

The present invention relates to means for assembling ladders, and more particularly stepladders.

The ladders are presently assembled on stationary supports which often have limited freedom of rotational movement, whereby the worker or workers need not move around the support during assembly, but eventually must make a few steps along the same to work at one or the other end of the ladder.

It has been found that the assembling of ladders is unduly extended and valuable time is wasted if one, two or three workers alone must assemble the entire device. Particularly the attachment of necessary hardware, such as braces, tie rods, washers, nuts, nails, platform brackets, safety shoes, and others, requires a variety of hand tools and automatic tools which are used for inserting, attaching, deforming or locking certain of the metallic parts, and two or even more workers stationed at the immobile support often interfere with another's work so that they cannot properly and quickly perform their duties. Also, the workmen must change their tools or insert parts by hand, and thus waste time when going from one to the next following assembling step.

An object of the invention is to provide a novel ladder carrier or jig which is particularly adapted for use in a system for stepwise assembly.

Another object of the invention is to provide a novel ladder carrier which is adapted for assembling of ladders and stepladders of different lengths and with different inclinations of their side rails.

A more specific object of the invention is to provide a jig for stepladders which includes simple and efficient means for adjusting with a single motion the position of steps with respect to the side rails, and means for preventing excessive turning of the jig during assembly of a ladder thereon.

The present invention further provides a jig for ladders, particularly stepladders, combined with a conveyor system for moving one or more jigs in a closed path while each jig retains at least partial freedom of rotational movement and of movement in the direction of its travel independently of the conveyor's motion.

In the preferred embodiment of the invention, a plurality of similarly constructed jigs are moved in a closed substantially elliptical path by an overhead conveyor at such distance from the floor and from one another as is best suited to the workmen who perform their duties at individual assembling stations. Each jig has an elongated shaft on which or with which a jig may turn from its normally horizontal position, and the shaft is so suspended on the overhead conveyor that it has certain freedom of movement in the direction of its longitudinal axis. The number of assembling stations, i.e., the number of jigs, may be varied, and depends primarily on the length of each ladder as well as on the amount of hardware to be attached thereto.

Many other features and attributes of the invention will become apparent and will be disclosed in detail in the course of the following description of certain embodiments selected for illustration in the accompanying drawing showing parts of and the entire assembly plant, and the invention will be finally pointed out in the appended claims.

In the drawing,

Fig. 7 is a section taken on line 7—7 in Fig. 6;

Fig. 17 is a section taken on line 17—17 in Fig. 16;

Figures 1, 2, 3:
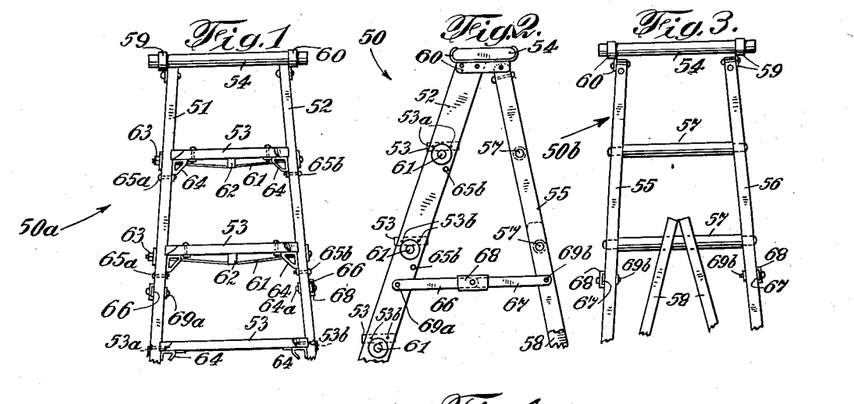
Figs. 1, 2 and 3 are respective front, side and rear elevational views of the so-called "Tioga" stepladder whose assembly is shown in the following figures.
Figure 4:
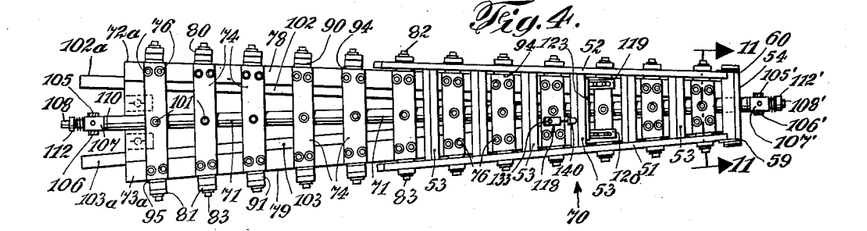
Fig. 4 is a top plan view of a novel jig with a partly assembled stepladder therein, as seen in the direction of arrows from line 4—4 in Fig. 5.

Referring now in detail to the drawing, stepladder 50 whose upper end is shown in side elevation in Fig. 2 consists of a front part or ladder 50a (Fig. 1) and of a back support 50b (Fig. 3), which latter is hingedly connected with the ladder 50a. The ladder 50a includes a pair of downwardly and outwardly tapering front rails 51, 52 and a plurality of horizontally aligned steps 53. The back support 50b includes a pair of rails 55, 56, horizontal rungs 57, and a V-brace 58.

The hardware on the ladder 50a includes a pair of top irons 59, 60 supporting the platform-like top 54 and hingedly connecting front rails 51, 52 with the upper ends of respective rails 56, 55 of the back support 50b; tie rods 61 with nuts 63; and knee braces 64 riveted to the lower faces of steps 53 and, by means of respective rivets 65a, 65b, to the front rails 51, 52. Stops 62 are inserted between each tie rod 61 and an adjacent step 53. Pairs of nails 53a, 53b are driven through respective rails 51, 52 and into the adjacent end faces of the steps 53.

Each front rail pivotally carries a side arm 66 connected thereto by means of rivets 69a; and rivets 69b connect similar arms 67 with the rails 55, 56 of the back support. The free ends of adjacent arms 66, 67 are articulately connected by members 68 which permit collapsing of the stepladder when pushed in the direction of platform 54 (see, for example, Figs. 27 and 28), but maintain the ladder in erected position for use when the pairs of side arms 66, 67 are in axial alinement (see Fig. 2).

Figure 5:
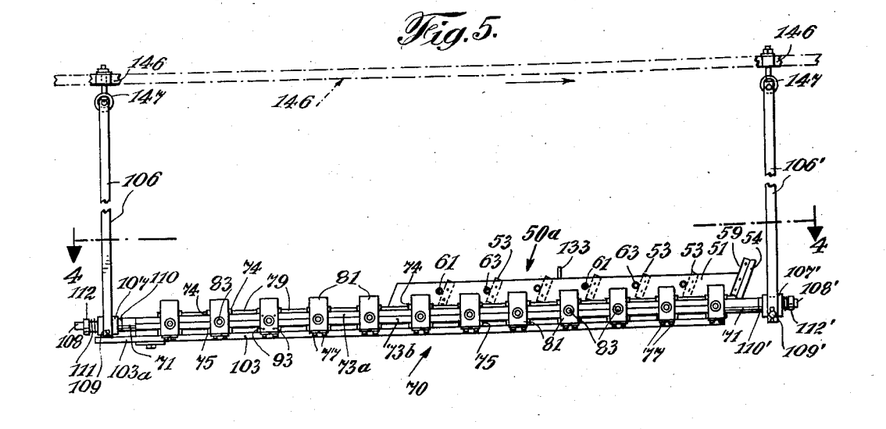
Fig. 5 shows the jig in side elevation suspended on the arms of an overhead conveyor.
Figure 6:
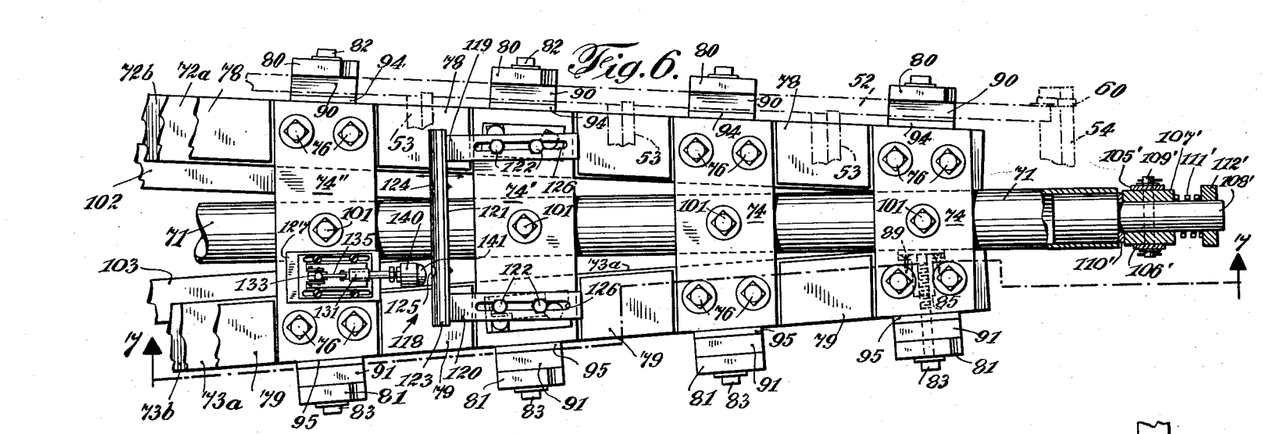
Fig. 6 is an enlarged top plan view of the right-hand end of the jig.

The ladder carrier or jig 70 is shown in full detail in Figs. 4 to 11. It is mounted on a substantially horizontal shaft 71, and includes two pairs of superposed stringers 72a, 72b and 73a, 73b, one pair on each side of the shaft (see Fig. 11) which carry spaced top and bottom cross pieces 74, 75 attached thereto in pairs by a plurality of bolts 76 and nuts 77 to form a rigid structure with the stringers 72 and 73 inclined toward one another from left to right in Fig. 4. Height blocks 78, 79 are fastened to the upper faces of respective stringers 72a, 73a between each pair of adjacent upper cross pieces 74, as is best shown in Figs. 6 and 7, to control the extent to which the steps 53 may extend beyond the rear faces of front rails 51, 52 when the ladder 50a is assembled in the jig. Guide plates 80, 81 are attached to the sides of respective stringer pairs 72a, 72b and 73a, 73b, and extend above the top cross pieces 74 to control the position of front rails 51, 52 of the ladder. They are connected with the stringers by means of bolts 82, 83 whose threads engage the internal threads in the bores of metallic sleeves 84, 85 which enter bores 86, 87 in the left- and right-hand pairs of stringers, respectively, and are secured to the stringers by means of wood screws 88, 89 (see Fig. 11). One or more spacers 90, 91 are permanently attached to the guide plates 80, 81, respectively, by means of nails 92, 93. The upper faces of the spacing members 90, 91 serve as supports for the front rails 51, 52, and are therefore at a level somewhat above the upper faces of the height blocks 78, 79.

Wedges 94, 95 are removably inserted between one end of each cross piece 74 and the adjacent spacing member 90, and between the other end of each cross piece 74 and the adjacent spacing member 91, respectively. The thickness of each wedge and the number of wedges are determined by the shape of the front half 50a of the stepladder, that is, the wedges determine the inclination between the front rails 51, 52. To be easily removable, each wedge has an open slot 96 which is sufficiently wide to receive one of the bolts 82, 83, whereby the wedges may be removed without dismounting the guide plates 80, 81 upon but a slight turning of the bolts 82, 83.

Dowels 97, 98, in vertical alignment with bolts 82, 83 and snugly fitted into respective guide plates 80, 81, extend into the bores 99, 100 from the opposing end faces of bottom cross pieces 75 to guide the plates 80, 81 and wedges 94, 95, and to prevent tilting or other displacement thereof which would bring the front rails 51, 52 and the steps 53 of the ladder out of desirable alignment.

The shaft 71 and cross pieces 74, 75 are connected by bolts 101, whereby the jig may be rotated with the shaft when desired.

Figure 8:
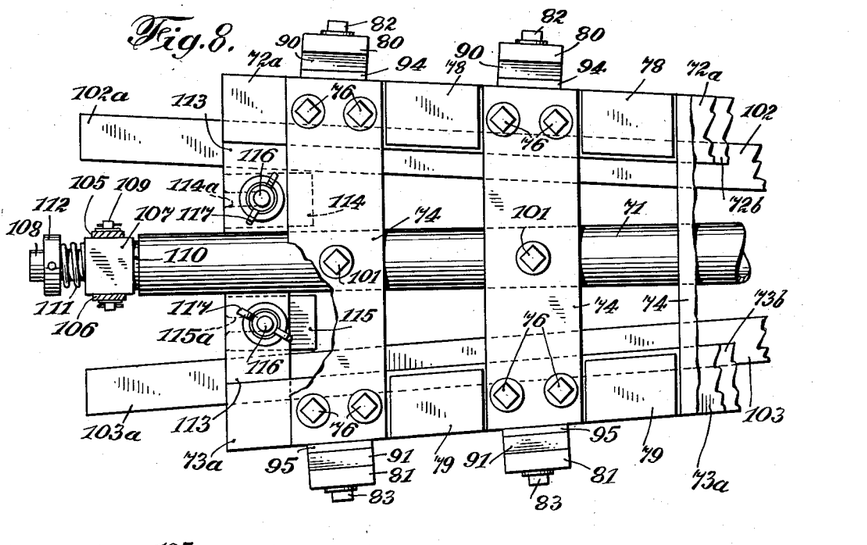
Fig. 8 is an enlarged top plan view of the left-hand end of the jig.
Figure 9:
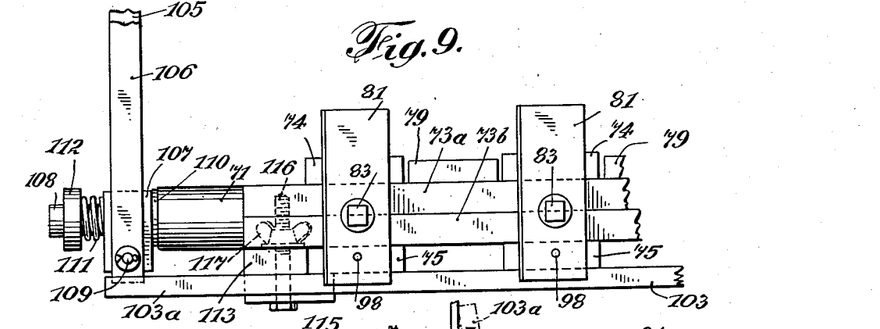
Fig. 9 is a side view of the structure shown in Fig. 8.

Elongated guard rails 102, 103 for the projecting nuts 77 and heads of bolts 101 are attached to the lower cross members 75 on both sides of the shaft 71. Rails 102, 103, with their respective extremities 102a, 103a, extend beyond the last cross member 75 at the left-hand end of the jig, as seen in Figs. 5 and 8, to act as rotary stops against the hanger arms 105, 106 on which the shaft 71 is suspended from the overhead conveyor system.

The left-hand end of shaft 71 (see Figs. 4, 5, and 8 to 10) is suspended at the lower ends of the hanger arms 105, 106 which carry a bearing block 107 receiving a short axle 108 fitting into the hollow shaft 71. The hanger arms 105, 106 are fastened to the parallel side faces of the bearing block 107 by a transverse pin 109, whereby the jig 70 is rotatable with, and swingable in the axial direction of, the shaft 71. The bearing block is mounted on the axle 108 between a friction washer 110 and a coil spring 111, the latter being retained on the axle by a fixed collar 112. The right-hand end of the shaft 70 (see Figs. 6 and 7) is suspended in similar fashion from arms 105', 106' by the elements identified by numerals 107' to 112'.

Leveling blocks or weights 114, 115 are attached to a transverse plate 113 at the left-hand end of the jig by bolts 116 and wing nuts 117. Each of the leveling blocks has an open slot 114a, 115a, respectively, whereby the blocks may be removed or interchanged or added by simply turning the wing nut 117 without entirely removing the bolts 116. The leveling blocks maintain the jig in a state of equilibrium and thus their weight is so selected that the workman need not exert too great a force for turning of the jig, but the jig is still prevented from uncontrolled turning in the bearing blocks 107, 107'.

On two adjacent top cross pieces 74' and 74" is installed a step alinement guide generally identified by numeral 118, and best shown in Figs. 6, 7, 12 and 13. It comprises two cooperating devices which are adapted to bring a step 53 into desired position with respect to the side rails 51, 52 of the ladder 50a. The stationary structure on the cross member 74' comprises a pair of slotted metallic support members 119, 120 which are secured to the cross member by two or more bolts 122. An inclined transverse plate 121 is welded to members 119, 120 in a position at right angles to the axis of shaft 71. Plate 121 carries a convex aligning member 123 which is removably attached thereto by two or more screwbolts and nuts 124, 125, respectively. Slots 126 in support members 119, 120 allow for adjustment of aligning bar 123 relative to the stationary parts of the jig 70.

The complementary part of the aligning device 118 is mounted on the upper cross member 74", and comprises a base 127 which carries a plate 128 secured thereto by four screws 129 in a manner permitting adjustments of plate 128 in the axial direction of shaft 71. Screws 129 are received in elongated closed slots 130. Plate 128 carries a bearing member 131 and a pair of flanges 132 in which is pivotally retained the lower end of the handle 133 by a pin 134. In the slot 137 in the median portion of the handle 133 is received one end of a short link 135 which is pivotally retained therein by a pin 136. The other end of the link 135 is pivotally connected to the forked extremity of a reciprocable rod 138 by a pin 139. Rod 138 extends through the bearing member 131 toward the aligning bar 123, and carries at its end facing said bar a metallic cylinder 140 for a wooden block 141. Counter nuts 142 permit removal and replacement of the block 141.

The operation of the step alinement device 118 is as follows: A ladder step 53 with its ends inserted into the prefabricated cutouts in side walls 51, 52 of a ladder to be assembled in the jig, is adjacent the aligning member 123. By moving the handle member 133 in the direction of arrow A (see Fig. 13), the wooden block 141 bears with its inclined surface against the opposing face of the step 53 and moves the entire front part 50a of the stepladder including the remaining steps 53 into proper position of alinement which is maintained throughout the assembling cycle while the jig 70 travels from one to the other assembling station, as will be described in full detail hereinafter. After the knee braces 64 and other hardware are fastened to the stepladder, the relative position of the steps 53 with respect to rails 51, 52 will remain unchanged.

The parts 123 and 141 of the aligning device which are in direct contact with a step 53 are preferably of some softer material, such as certain types of wood or the like, to avoid any impressions in the step. As they are exposed to some wear and tear, replacement after a certain period of use becomes necessary.

Figure 14:
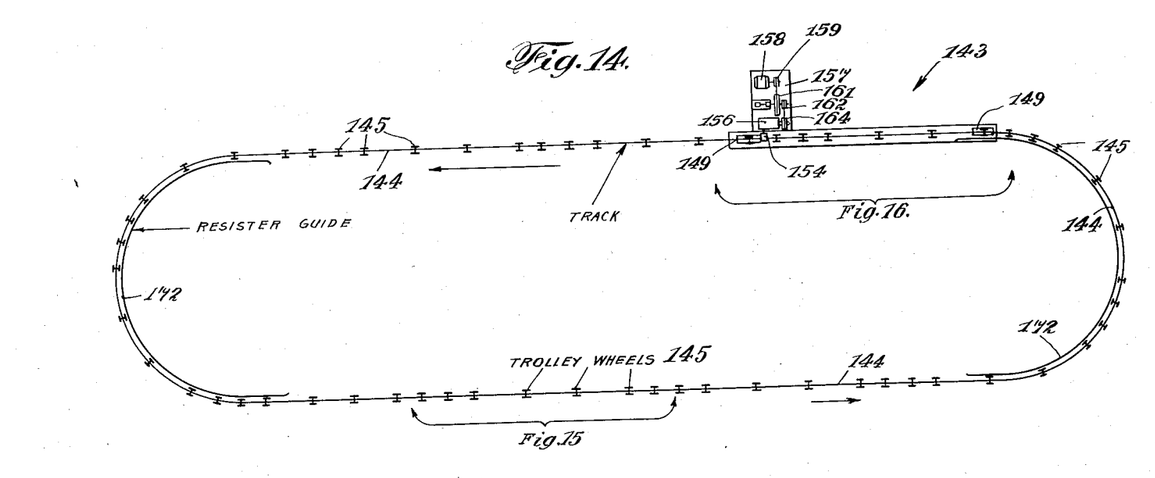
Fig. 14 is a diagrammatic top plan view of the overhead conveyor system for a series of jigs.

The overhead conveyor system 143 for the jigs 70 suspended on hanger arms 105, 106 and 105', 106' is shown in Figs. 14 to 17. It includes a track 144 for the trolley wheels 145 on which is suspended a plurality of articulately connected, preferably flexible links 146, the latter pivotally carrying the upper ends of hanger arms 105, 106 and 105', 106' by means of eye bolts 147. Due to the articulate connection of links 146, each jig 70 may move in the path defined by the track 144, as is best shown in Figs. 14 and 18.

Figures 14, 16:
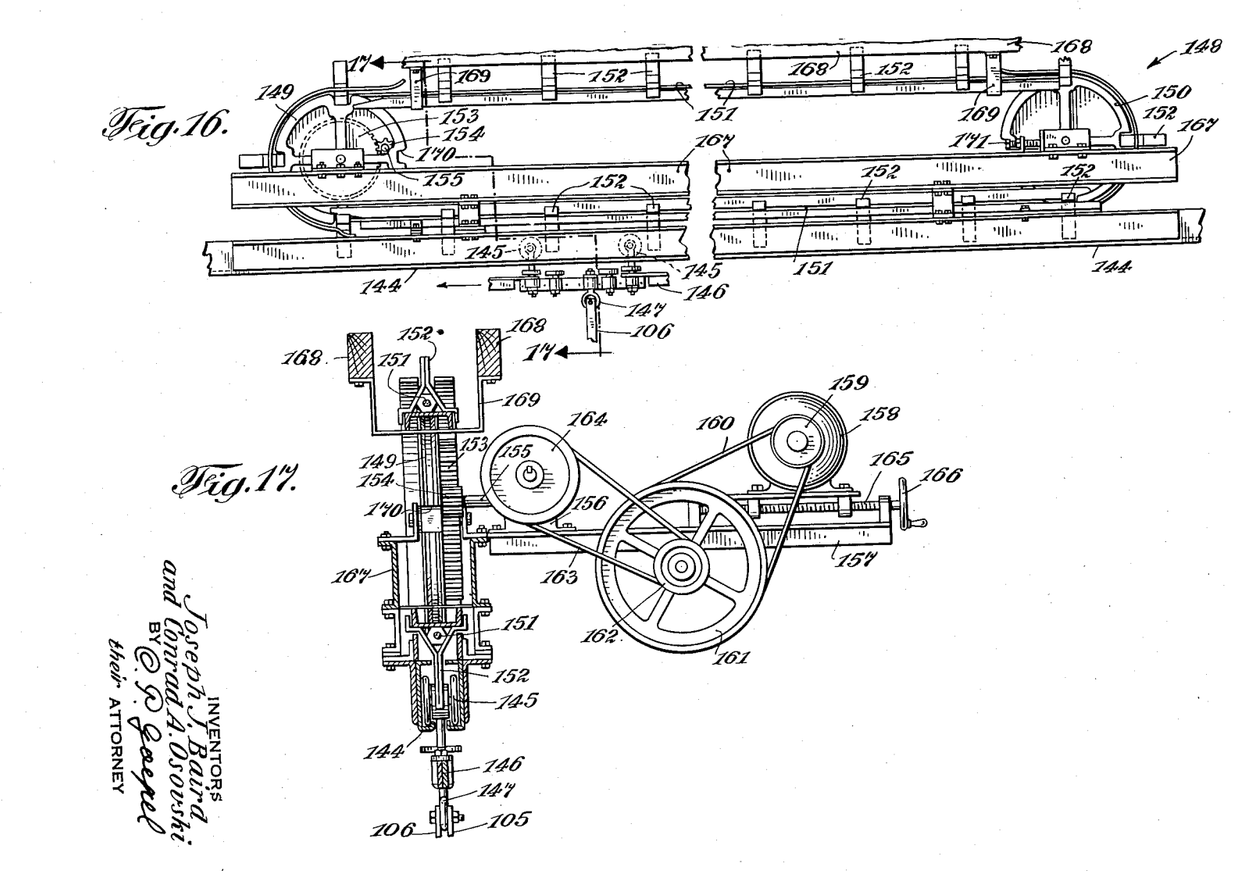
Fig. 16 is a large scale illustration of the drive mechanism for the jig carrier.
Figure 15:
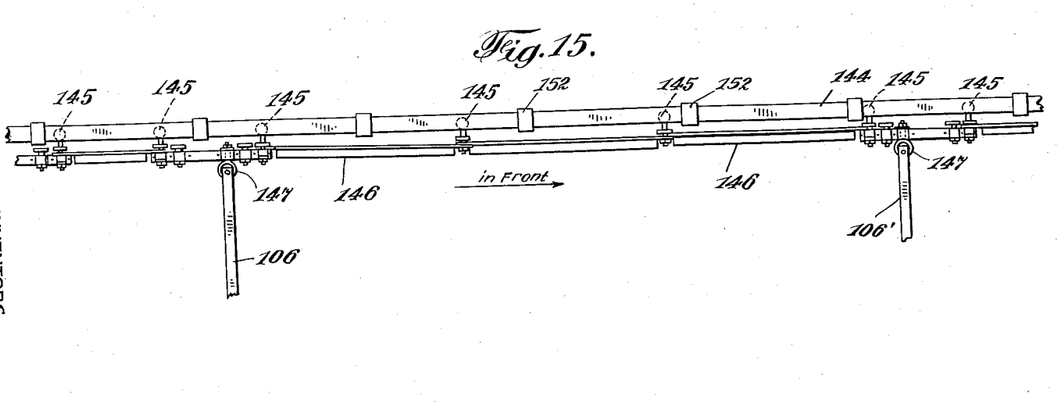
Fig. 15 shows in side elevation and drawn to a larger scale the bracketed off part of the articulate jig carrier illustrated in Fig. 14.

Trolley wheels 145 are caused to continuously or intermittently travel in the track 144 by a drive mechanism 148 which includes a pair of spaced sprockets 149, 150 over which moves a flexible endless connecting belt 151 carrying a plurality of suitably spaced drive lugs 152 which, during their travel in one direction between the sprockets 149, 150, continuously engage successive trolley wheels 145 and thus move the links 146 with hanger arms and jigs from one to the other assembling station. To the shaft of drive sprocket 149 is attached a cogwheel 153 which meshes with the pinion 154 on a shaft 155 extending into the gear case 156 mounted on a platform 157. On the latter is installed an electric motor 158 which drives the pinion 154 through the intermediate pulley and belt system identified by reference numerals 159, 160, 161, 162, 163 and 164, in that order. Motor 158 is mounted on an externally threaded shaft 165 which may be rotated by a hand wheel 166 to control the tension in the belt 160. By suitable selection of the pulleys 159, 161, 162 and 164, as well as of pinion 154 and cogwheel 153, the trolley wheels 145 may be driven at a desired speed best suited to the workmen at the individual assembling stations. The frame 167 of the drive unit is suspended from the joists 168 by a plurality of spaced metallic supporting members 169. The drive sprocket 149 has a plurality of recesses 170 in which portions of drive lugs 152 are received as they travel over the sprocket. The similarly constructed idler sprocket 150 is adapted to be moved toward and away from the drive sprocket 149 by a tension adjuster 171.

The overhead conveyor system 143 for the jigs 70 has many advantages because it occupies no floor space and permits communication with the interior of the track 144 between the spaced jigs 70. Each jig may be rotated with its shaft 71 in bearing members 107, 107'; it has sufficient freedom of movement in the axial direction of the shaft due to the articulate connection of hanger arms with the bearing members and with the links 146 suspended on trolley wheels 145 at the upper ends of the hanger arms. The area within the closed track 144 is customarily used for storage of certain prefabricated parts to be attached to the stepladders during the assembling cycle, as is disclosed in full detail in the following description of Figs. 18 to 28.

Figure 18:
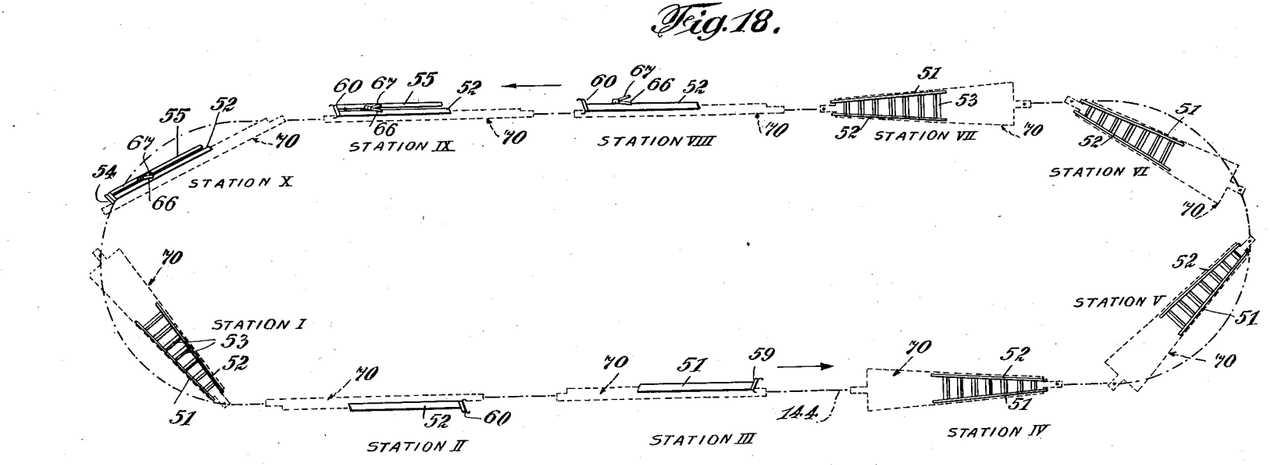
Fig. 18 is a diagrammatic bird's eye view of a ten-station ladder assembly system without showing the conveyor and drive.
Figure 19:
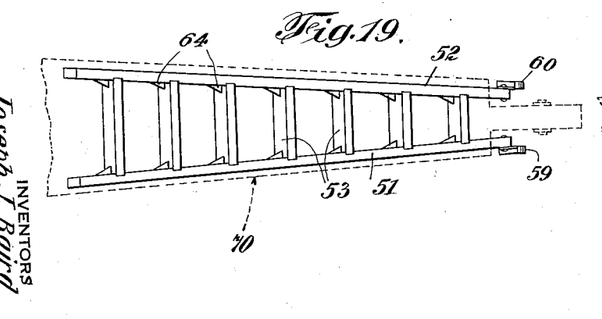
Figs. 19 to 28 illustrate a stepladder in progressive stages of completion at the assembling stations shown in Fig. 18.

Fig. 18 shows diagrammatically ten assembling stations in the closed path of the track 144. The overhead conveyor 143 and its drive 148 are omitted, and the jigs 70 are shown in dotted lines. The assembling plant with ten stations has been selected for the purposes of illustration only, as it will be appreciated that the number of stations will depend on many factors, such as the length of stepladders assembled on the jigs, the amount of hardware to be attached to each ladder, the amount of hardware preassembled with certain parts of the ladder prior to the final assembly on the jig, the skill of personnel employed, as well as space considerations and many other factors. For example, the track 144 may be fully circular if the space available for the assembly plant is more or less square or polygonal. The track shown in Figs. 14 and 18 is preferred because it requires a relatively simple construction and suspension in its straight sections without the resistor guides 172 in the curved sections of the track (see Fig. 14).

It will be noted in Fig. 18 that the jig, at certain assembling stations, is turned from horizontal in clockwise or counterclockwise direction, as the need may be, and depending on whether the workmen at a certain station must attach parts to the left- or right-hand rail 51, 52, respectively (as seen in Fig. 1).

Figs. 19 to 28, drawn to a larger scale, show the extent of completion of a stepladder 50 at the successive stations I to X. At the assembling station I (Fig. 19), the attending workman or workmen insert the side rails 51, 52 and transverse steps 53 of a ladder 50a into the jig 70 which is in its horizontal position. It will be seen that the knee braces 64 are already riveted to the steps at station I, as well as that the top irons 59, 60 are preassembled on the upper ends of respective side rails 51, 52. Of course, parts 59, 60 and 64 could be assembled at one of the stations I to X, or an additional station could be provided for this purpose. The device 118 (not shown in Figs. 18 to 28) is then actuated to bring the members 51, 52 and 53 into required position of alinement. As an inspection of Figs. 11 and 13 reveals, the side rails 51, 52 rest on the spacing members 90, 91, respectively, and are adjacent the respective left- and right-hand guide plates 80, 81. Each step abuts on a pair of symmetrically disposed height blocks 78, 79 with its lower longitudinal edge 53'', whereby its somewhat arcuate face 53' stays practically flush with the front faces of side rails 51, 52 (see Fig. 13).

The longitudinal ends of the steps 53 are received in suitable recesses of required inclination which are provided in the inner faces of side rails 51, 52 in the manufacture of the latter. The steps 53 fit into such recesses in the known tenon and mortise fashion.

Figure 10:
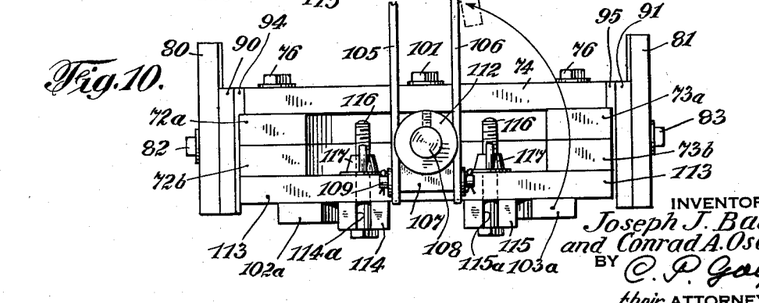
Fig. 10 is a left-hand end view of the jig.
Figure 11:
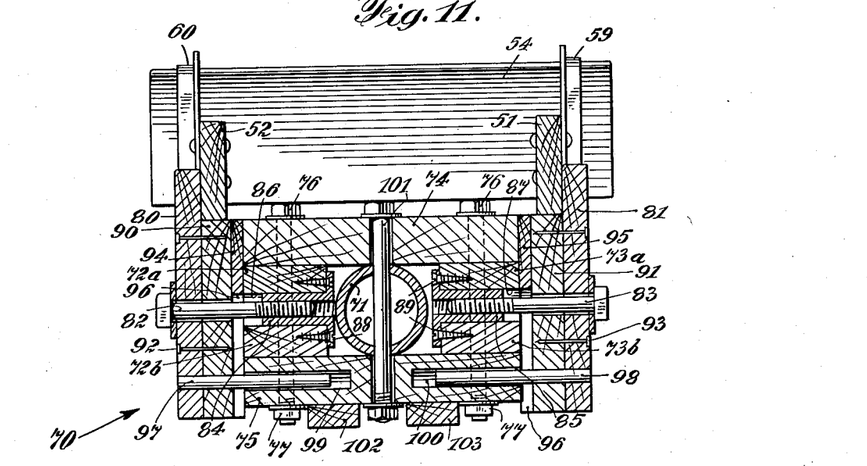
Fig. 11 is an enlarged transverse section taken on line 11—11 in Fig. 4.
Figure 12:
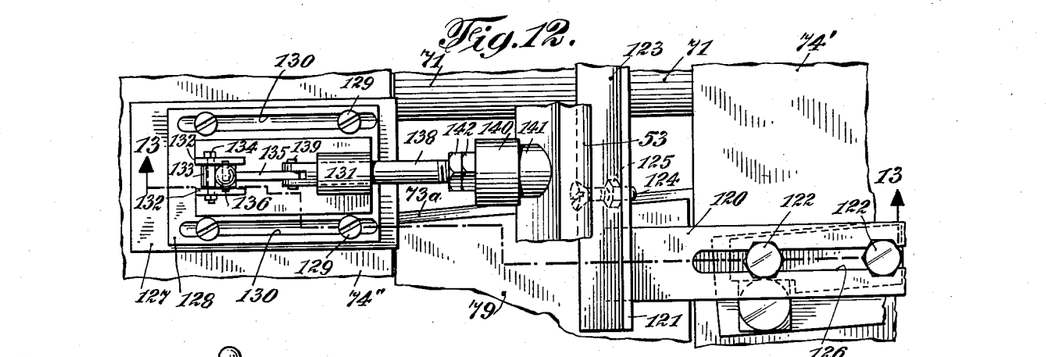
Fig. 12 is an enlarged top plan view of the aligning device.
Figure 13:
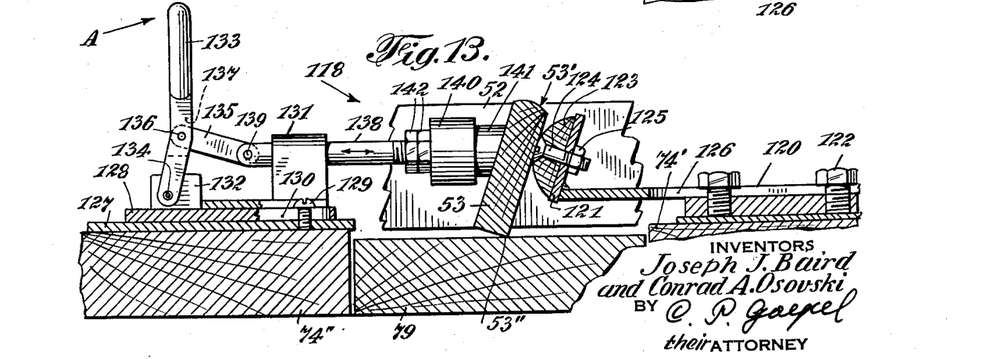
Fig. 13 is a section taken on line 13—13 in Fig. 12.
Figure 20:
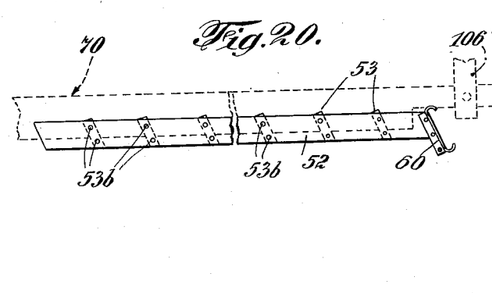
Figure 21:
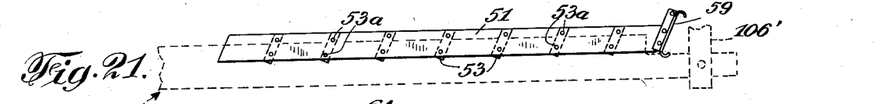
Figure 22:
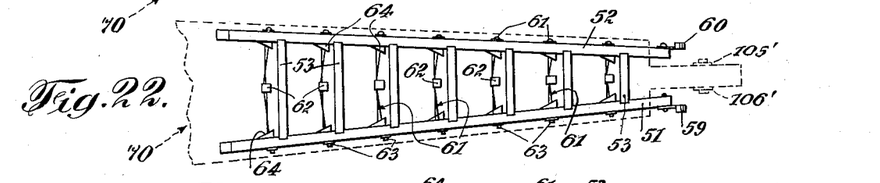

At station II, the jig 70 is turned through about 90 degrees as far as permitted by the rotary stop 103a (not shown) which abuts against the hanger arm 106 of the overhead conveyor system (see the dot-dash position of member 103a in Fig. 10). In this position of the ladder 50a, its side rail 52 is on top, i.e., in best position for a workman to drive in the nails 53b into the steps 53 as the jig travels toward the station III. The position of the ladder 50a at station II is shown in Fig. 20.

At station III (Fig. 21), the jig is turned through about 180 degrees until the rotary stop 102a abuts against the hanger arm 105, and nails 53a are then driven into the opposing end faces of steps 53.

At station IV (Fig. 22), where the jig 70 is back in horizontal position, and which may be manned by two or more workmen, tie rods 61 are inserted through the prefabricated bores in side rails 51, 52, and a nut 63 screwed loosely onto the externally threaded end of each tie rod 61, adjacent the outer face of rail 51. Stops 62 are also inserted between each tie rod 61 and an adjacent step 53 before the nuts 63 are turned tight at station V (see Fig. 23), usually by means of an automatic tool, as is well known and customary in the art. At station V, rivets 65a are inserted through prefabricated holes in side rail 51 and knee braces 64.

Figures 23, 24, 25:
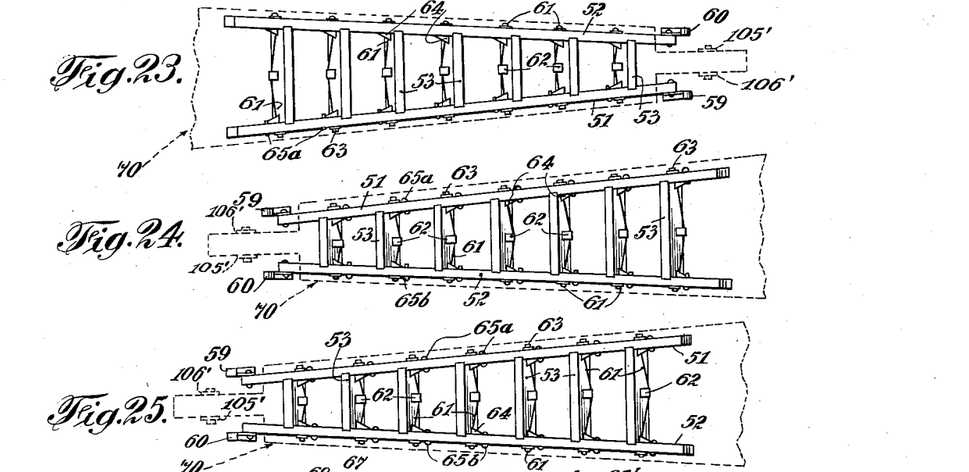

At station VI, the rivets 65a are headed by means of a suitable automatic tool, and another workman standing on the other side of the jig 70 inserts the rivets 65b through the holes in the side rail 52 and adjacent knee braces 64 (see Fig. 24).

Rivets 65b are permanently fastened to the side rail 52 at the station VII (Fig. 25).

An arm 66 is pivotally connected with each of the side rails 51, 52 at station VIII (Fig. 26) by means of rivets 69a. Arms 66 are preassembled with members 67 and 68.

Figures 26, 27, 28:
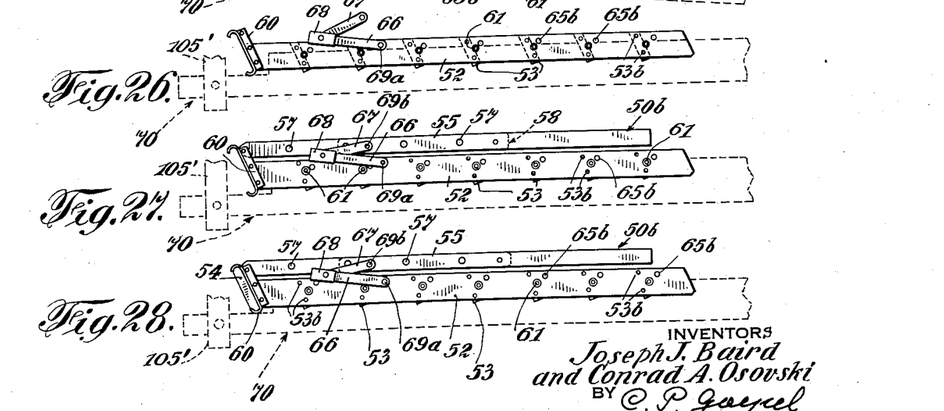
Figure 29:
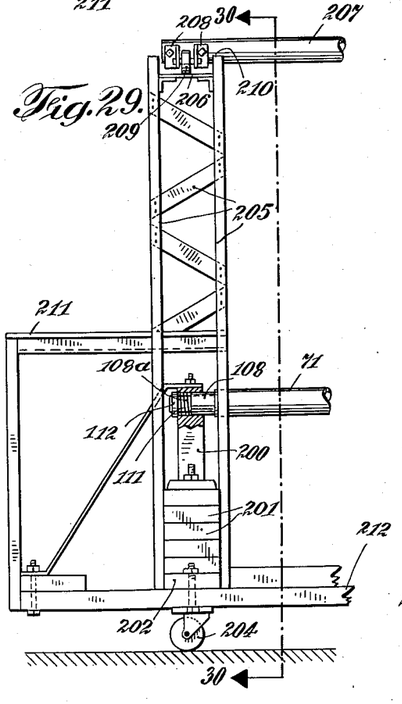
Fig. 29 is a side elevational view of the left-hand end of a roller-mounted jig carrier.
Figure 30:
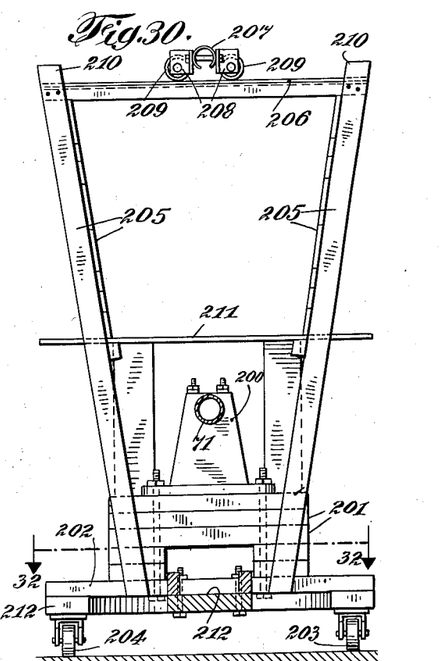
Fig. 30 is a section taken on line 30—30 in Fig. 29.
Figure 31:
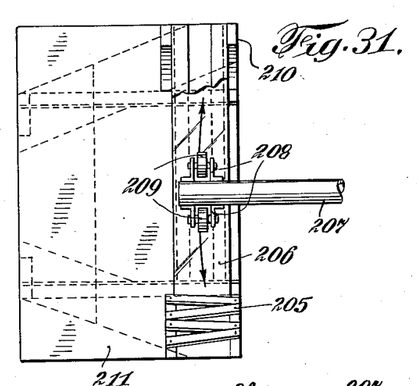
Fig. 31 is a top plan view of the structure shown in Fig. 29.
Figure 32:
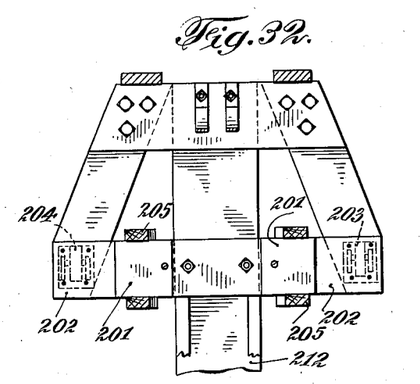
Fig. 32 is a section taken on line 32—32 in Fig. 30.
Figure 33:
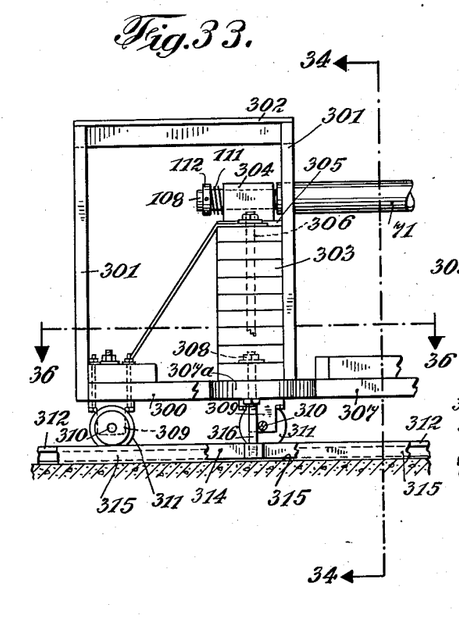
Fig. 33 is a side elevational view of the left-hand end of a roller-mounted jig carrier with floor drive and sunken rails, as seen from line 33—33 in Fig. 34.
Figure 34:
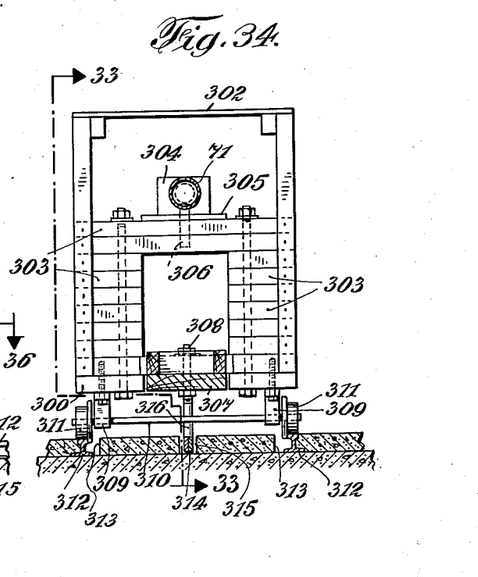
Fig. 34 is a section taken on line 34—34 in Fig. 33.
Figure 35:
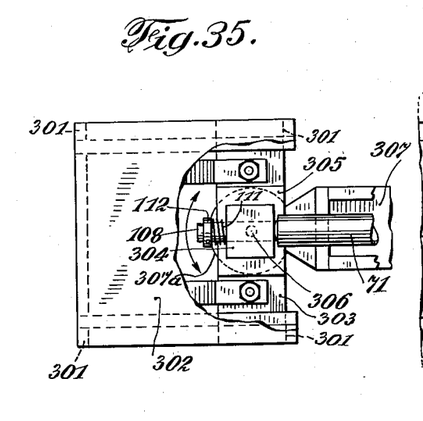
Fig. 35 is a top plan view of the device shown in Fig. 33 with certain parts broken away for the convenience of illustration.

At the station IX, preassembled back support 50b consisting of side rails 55, 56, rungs 57 and a V-brace 58, is attached to the top irons 59, 60, and to the arms 67 (to the latter by means of rivets 69b), as is shown in Fig. 27.

Finally, at station X (Fig. 28), the top platform 54 is inserted between the upwardly curved prongs of top irons 59, 60 whereupon the completely assembled stepladder 50 is removed from the jig after the step aligning device 118 is first released by actuation of handle 133. The empty jig then travels toward station I and the above described sequence of steps is repeated with a new stepladder.

Of course, a pail rest or special safety shoes for the lower ends of front rails 51, 52 may be mounted on the stepladder at one of the stations I to X, or at an additional station, if desired. The spaced jigs may travel quickly if each station is fully manned and if the ladder to be assembled is relatively short, for example, having only three or four steps instead of seven shown in Figs. 18 to 28. The movement of the jigs may be intermittent in that the jigs could come to a full stop at each station, especially if long stepladders must be assembled which, of course, entails much more labor and time at each station.

If the taper of the side rails 51, 52 must be changed, wedges 94, 95 either may be added to, or removed from, the jig. It is also within the scope of the present invention to omit the wedges altogether and to provide one or more reciprocable slides at one or both sides of the supporting platform of the jig, as is shown in Figs. 37 to 40. However, the wedges have proven to provide the simplest and cheapest solution for the presently employed jig structures.

Figs. 29 to 32 illustrate one end of a castor mounted jig support which requires no overhead conveyor. The axle 108 in the left-hand end of jig shaft 71 (jig not shown) is received in a bearing block 200. Load tension spring 111 is mounted on a reduced portion of the axle 108 between the shoulder 108a and a collar 112 to permit slight movement of the shaft 71 in axial direction thereof. Bearing 200 is supported on the fillers 201 which in turn rest on and are attached to the base member 202. The latter carries two castors 203, 204 and a rigid bracing structure cumulatively identified by reference numeral 205, which supports a horizontal platform 206 for the monorail 207 used by workmen for suspension of tools. The end of monorail 207 has attached thereto two pairs of flanges 208 which support the shafts of rollers 209. The rail 207 may be moved between stops 210 provided at the upper end of bracing 205.

Table 211 serves for storage of prefabricated and preassembled parts to be finally assembled on the jig. Additional parts may be stored on the lower support member 212 connecting the left-hand base 202 with the right-hand base at the other end of the jig shaft 71 (not shown).

While no means for moving the castor wheel mounted jig is shown, it will be understood that the structure shown in Figs. 29 to 32 may be driven in a closed path to assemble thereon stepladders in a fashion similar to that previously disclosed.

Figure 36:
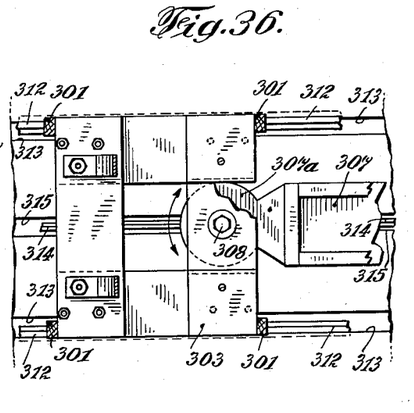
Fig. 36 is a horizontal section taken on line 36—36 in Fig. 33.

A somewhat modified carrier or truck for the jig shaft 71 is shown in Figs. 33 to 36. It includes a base 300 which carries four supports 301 for a table or platform 302 serving for storage of material to be assembled in the jig (not shown). The base member 300 further supports a plurality of fillers 303 and a steel plate 305 to which is secured a bearing and pivot block 304 by a pivot pin 306. The bearing block 304 receives the axle 108 which fits into the end of shaft 71. The axle has limited freedom of axial movement determined by a coil spring 111 and a collar 112. To the base 300 is pivotally connected a support member 307 whose end 307a is rounded, as best shown in Fig. 36, and is retained by a king pin 308 coaxially below the pin 306. To the lower face of the base 300 are fastened four wheel bearings 309 for two parallel wheel shafts 310. Each shaft carries two wheels 311 traveling on tracks 312 provided in the recesses 313 in the floor.

A flexible connecting link 314 extends into a groove 315 in the floor between the grooves 313 and is connected with the truck body 300 through a member 316. Due to such construction, the truck body 300 and connector 307 may pivot with respect to one another in a horizontal plane on the member 308, and the bearing block 304 may pivot with respect to the base 300 while the shaft 71 is free to rotate in the bearing block to the extent determined by, for example, the connecting member 307 against which the side of the turning jig 70 abuts.

It will be understood that the other end of the shaft 71 rests in a second bearing block similar to member 304, which in turn is carried by a truck structure of a design identical with that of Figs. 33 to 36.

The flexible connecting link 314 may be moved by any suitable device, such as an electric or gasoline motor to again move the series of truck mounted jigs in a closed path of desired shape and length. The drive mechanism for the flexible link 314 is preferably hidden in the floor, and the connection between bolt 316 and either base 300 or link 314 may be such that a truck can be easily disconnected from the link and either brought closer to an adjacent truck or moved a greater distance away, whereby to increase or reduce the number of working stations in the assembling cycle.

While more stable and providing more storage room for workmen than the suspended jig structure, the embodiments of Figs. 29 to 36 have certain disadvantages with respect to the former embodiment, in that the grooves 313 and 315 require frequent cleaning and that the provision of above-floor rails is preferably avoided. Of course, jigs mounted on two trucks may be used for assembly of stepladders outside of the assembling cycle. Thus, the advantage of the truck mounted jig is that it may be moved anyplace in the shop away from the conveyor mechanism, whereas the jig suspended from an overhead conveyor is more place bound.

Figure 37:
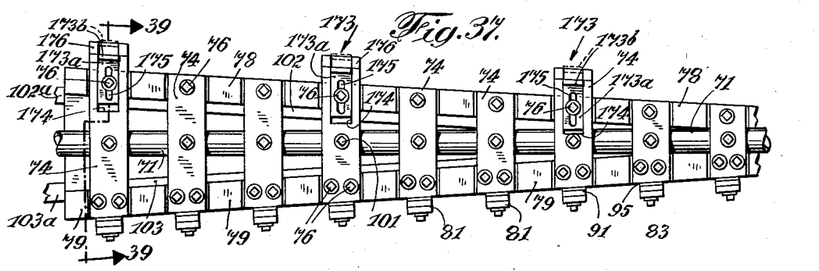
Fig. 37 is a partial top plan view of a modified jig.
Figure 38:
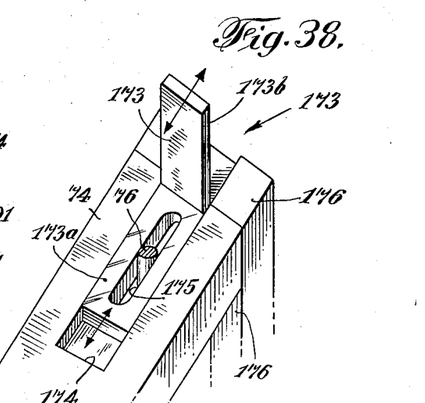
Fig. 38 is an enlarged perspective view of a detail in Fig. 37.
Figure 39:
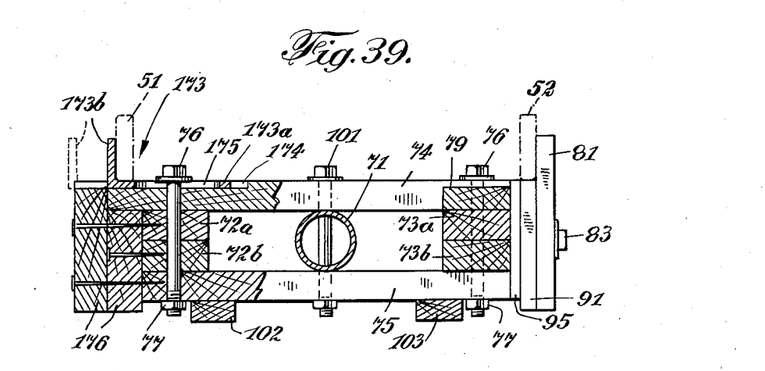
Fig. 39 is a section taken on line 39—39 in Fig. 37.

Figs. 37 to 39 illustrate a jig of modified construction in which the wedges 94, 95 are replaced by angular rail stops 173 provided in recesses 174 at one longitudinal end of certain upper cross pieces 74. Each rail stop 173 has a closed slot 175 in its horizontal leg 173a which receives the bolt 76 and is thus free to move in the slot 174 in a direction transverse to the axis of jig shaft 71. Support members 176 are attached to the stringers 72a, 72b and to the lower cross pieces 75 to provide a seat for the rail stops 173 when they move outwardly beyond the end faces of the upper cross pieces 74. The rail stops 173 may be maintained in a desired position when the nuts 77 on bolts 76 are drawn tight. The outer face of ladder rail 51 rests against the vertical legs 173b of the rail stops.

For the manufacture of certain types of stepladders in which the side rails corresponding to members 51, 52 shown in Fig. 1 each consist of a straight and an outwardly curving portion, the slot 174 in each member 74 may be widened out to give rail stops 173 partial freedom of rotational movement about the bolts 76.

Figure 40:
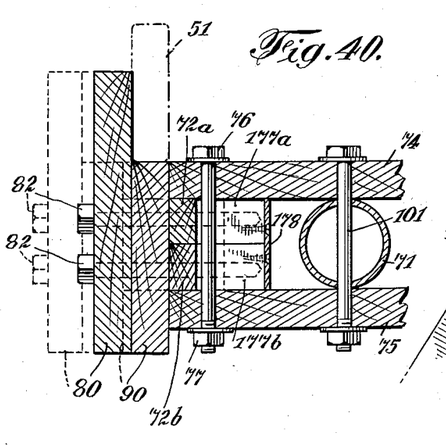
Fig. 40 is a transverse section through a further embodiment of the jig.

A further modification of the jig is shown in Fig. 40. In this embodiment, the guide plates 80, spacers 90 and the stringers 72a, 72b may move jointly in a direction transverse to the jig shaft 71. Slots 177a, 177b in respective stringers 72a, 72b permit outward displacement of the stringers transversely of bolts 76 to the extent controlled by metallic plates 178 which close the open ends of slots 177a, 177b. A ladder rail 51 (shown in dot-dash lines) rests on the spacer 90 and abuts against the adjacent face of guide plate 80. The advantage of the structures shown in Figs. 37 to 40 is in that only one side of the jig requires adjustment if the width or inclination of the front rails should be changed. By proper selection of weights, the jig remains in equilibrium despite the asymmetric position of rails with respect to the shaft 71.

It will be seen that the present invention provides a novel jig structure which is particularly adapted for use in assembling prefabricated parts of stepladders. The preceding description, delving in details of certain constructional features, however, should not be construed in a limitative sense as various changes and modifications within the spirit of this invention and within the scope of the appended clams will occur to persons skilled in the art. For example, the stringers, cross pieces, fillers and other reinforcing and supporting parts of the jig may be replaced by a suitably shaped solid unitary element to serve as a platform for assembly of the stepladder thereon. Furthermore, the step alinement guide 118 may be replaced by a pair of stops at one or the other longitudinal end of the jig against which the ends of the ladder rails abut during the assembly of the device.

What we claim and now desire to protect by Letters Patent is:

1. A jig adapted for assembly of ladders therein, comprising, in combination, an elongated central supporting member having a longitudinal axis and two extremities; means operatively connected with the extremities of said supporting member for rotatably holding same in substantially horizontal position; an elongated ladder supporting platform member connected with and symmetrically traversed by said supporting member, said platform member having a ladder supporting sides; uniformly spaced lateral rail stops extending beyond the ladder supporting side of said platform member; means for adjustably connecting said lateral rail stops with said platform member in a direction substantially transverse to the longitudinal axis of said supporting member; and step alinement guide means on said platform member including a stationary member rigidly attached to said platform member and having an arresting surface at right angles to the axis of said supporting member, a movable member, and means for reciprocating said movable member away from and toward said arresting surface for alternately releasing and urging a ladder step toward and into contact with said arresting surface.

2. A jig adapted for assembly of stepladders therein, comprising, in combination, an elongated shaft having a longitudinal axis and two extremities; means operatively connected with the extremities of said shaft for rotatably holding same in substantially horizontal position; an elongated stepladder supporting platform member connected with and symmetrically traversed by said shaft, said platform member having a ladder supporting side; uniformly spaced lateral rail stops extending beyond the ladder supporting side of said platform member; means for adjustably connecting said lateral rail stops with said platform member in a direction substantially transverse to the longitudinal axis of said shaft; and step alinement guide means on said platform member including a stationary member rigidly attached to said platform member and having an arresting surface inclined with respect to the ladder supporting side of said platform member and at right angles to the axis of said shaft, a movable member, and means for reciprocating said movable member away from and toward said arreseting surface for alternately releasing and urging one step of a stepladder toward and into contact with said arresting surface.

3. A jig adapted for assembly of stepladders therein, comprising, in combination, an elongated central supporting member having two extremities and a longitudinal axis; means operatively connected with the extremities of said supporting member for rotatably holding same in substantially horizontal position; an elongated ladder supporting platform member connected with and symmetrically traversed by said supporting member, said platform member having a ladder supporting side, two short parallel sides and two elongated sides converging toward one extremity of said support member; uniformly spaced lateral rail stops extending beyond the ladder supporting side of said platform member; means for adjustably connecting said lateral rail stops with said elongated sides of said platform member in a direction substantially transverse to the longitudinal axis of said support member; and step alinement guide means on said platform member including a stationary member rigidly attached to said platform member and having an arresting surface inclined with respect to the ladder supporting side of said platform member and at right angles to the axis of said support member, a movable member, and means for reciprocating said movable member away from and toward said arresting surface for alternately releasing and urging a step of a stepladder toward and into contact with said arresting surface.

4. A jig adapted for assembly of stepladders therein, comprising, in combination, an elongated shaft having two extremities; means operatively connected with the extremities of said shaft for rotatively holding same in substantially horizontal position; an elongated ladder frame defining a platform member connected with and symmetrically traversed by said shaft, said platform member having a ladder supporting side, said frame including a pair of longitudinal frame members converging toward one extremity of said shaft and a plurality of equally spaced transverse frame members; uniformly spaced lateral rail stops extending beyond the ladder supporting side of said frame; and means for adjustably connecting said rail stops with said transverse frame members in a direction substantially transverse to the longitudinal axis of said shaft.

5. A jig adapted for assembly of stepladders therein, comprising, in combination, an elongated shaft having two extremities and a longitudinal axis; means including two pairs of arms operatively connected with the extremities of said shaft for rotatably seuspending same in substantially horizontal position; an elongated stepladder supporting platform member connected with and symmetrically traversed by said shaft, said platform member having a ladder supporting side; said platform member including a pair of longitudinally extending frame members converging toward one extremity of said shaft, a plurality of equally spaced transverse frame members, each of said frame members having an end face, and a pair of stop rails extending from said longitudinal frame members for engaging with said arms when said platform member is rotated through about 90 degrees from horizontal position; uniformly spaced lateral rail stops extending beyond the ladder supporting side of said platform member; means for adjustably connecting said lateral rail stops with said transverse frame members in a direction substantially transverse to the longitudinal axis of said shaft; and removable wedge means installed between said rail stops and the end faces of said transverse frame members.

6. A jig adapted for assembly of ladders therein, comprising, in combination, an elongated central supporting member having two extremities and a longitudinal axis; means operatively connected with the extremities of said supporting member for rotatably holding same in substantially horizontal position; an elongated ladder supporting platform member connected with and symmetrically traversed by said supporting member, said platform member having a supporting surface, an undersurface, and two end faces; uniformly spaced lateral rail stops extending beyond the supporting surface of said platform member; means for adjustably connecting said lateral rail stops with said platform member in a direction substantially transverse to the longitudinal axis of said support member; removable wedge means between each of said rail stops and the adjacent end faces of said platform member; and leveling means for maintaining said platform member in a position of equilibrium, said leveling means including a pair of weights substantially symmetrically disposed with respect to said supporting member and means for removably connecting said weights with the underside of said platform member.

7. A jig adapted to support the side rails and the steps of a stepladder therein, comprising, in combination, an elongated central supporting member having two extremities and a longitudinal axis; means operatively connected with the extremities of said supporting member for rotatably holding same in substantially horizontal position; an elongated stepladder supporting platform member connected with and symmetrically traversed by said supporting member, said platform member having a plurality of longitudinally extending frame members symmetrically disposed with respect to and converging in the direction of one extremity of said supporting member, and a plurality of transverse frame members equally spaced from one another and connected with said longitudinal frame members in a direction at right angles to the longitudinal axis of said supporting member, each of said transverse frame members having an upper face and an end face, said platform member having portions between said transverse frame members disposed at a level below the plane of the upper faces of said transverse frame members; uniformly spaced lateral rail stops extending beyond the upper faces of said transverse frame members; means for adjustably connecting said rail stops with the end faces of said transverse frame members in a direction substantially transverse to the longitudinal axis of said support member; with the side rails of a stepladder adapted to be placed onto said platform member into abutment with said rail stops whereby the steps rest on said portions between said transverse frame members; and step alinement guide means supported by said platform member and including a stationary member rigidly attached to the upper face of one of said transverse frame members adjacent to one side of one of said steps and having an arresting surface at right angles to the axis of said supporting member, a movable member supported by the upper face of an adjacent transverse frame member and adjacent to the other side of said step, and means for reciprocating said movable member from and toward said arresting surface for alternately releasing and urging a step into contact with said arresting surface.

8. A jig adapted for assembling of stepladders therein, comprising, in combination, an elongated shaft having two extremities and an axis; means operatively connected with the extremities of said shaft for holding same in substantially horizontal position; an elongated ladder supporting platform member connected with and symmetrically traversed by said shaft, said platform member having a first and a second longitudinal side symmetrically disposed with respect to said shaft and converging in the direction of one extremity of said shaft, two shorter sides transverse to the axis of said shaft, an upper face adapted to support the side rails and the steps of a stepladder, and a lower face; lateral rail stops extending beyond said upper face of said platform member and uniformly spaced from one another along said longitudinal sides of said platform member; connecting means for said rail stops disposed along said first longitudinal side of said platform member; means for uniformly moving said connecting means toward and away from said first longitudinal side of said platform member; and leveling means for maintaining said platform member in a position of equilibrium, said leveling means including a plurality of weights removably connected to said lower face of said platform member.

9. As a novel article of manufacture, a jig for assembling of stepladders comprising an elongated shaft; a platform member having a pair of converging longitudinal sides and a pair of substantially parallel transverse sides, said platform member being symmetrically traversed by said shaft between said longitudinal sides thereof and having a supporting surface with a plurality of transverse recesses spaced from one another at distances corresponding to the distance between a pair of adjacent steps of a stepladder to be assembled in said jig; means for rotatably supporting said shaft and said platform member in substantially horizontal position; and lateral rail stops attached to said longitudinal sides of said platform member between said recesses and extending beyond said supporting surface thereof.

References Cited in the file of this patent

UNITED STATES PATENTS

| | | |
|---|---|---|
| 1,645,414 | Kalgren | Oct. 11, 1927 |
| 1,842,850 | Uline | Jan. 26, 1932 |
| 2,356,540 | Schwinn | Aug. 22, 1944 |
| 2,648,896 | Krumm | Aug. 18, 1953 |
| 2,657,666 | Fowler | Nov. 3, 1953 |
| 2,664,993 | Mullen et al. | Jan. 5, 1954 |
| 2,765,525 | O'Neill | Oct. 9, 1956 |
| 2,769,230 | Nystrom | Nov. 6, 1956 |
| 2,792,927 | Mullen et al. | May 21, 1957 |
| 2,796,973 | Mullen et al. | June 25, 1957 |

FOREIGN PATENTS

| | | |
|---|---|---|
| 50,135 | Netherlands | Apr. 15, 1941 |